United States Patent
Mast et al.

(10) Patent No.: US 12,139,667 B1
(45) Date of Patent: Nov. 12, 2024

(54) FRICTION REDUCTION OF ACIDIC TREATMENT FLUIDS

(71) Applicant: Halliburton Energy Services, Inc., Houston, TX (US)

(72) Inventors: Nicole Mast, Houston, TX (US); Enrique Antonio Reyes, Houston, TX (US); Antonio Recio, III, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/217,069

(22) Filed: Jun. 30, 2023

(51) Int. Cl.
| | | |
|---|---|---|
| *C09K 8/74* | (2006.01) | |
| *C09K 8/80* | (2006.01) | |
| *E21B 43/27* | (2006.01) | |
| *E21B 43/28* | (2006.01) | |

(52) U.S. Cl.
CPC ............. *C09K 8/74* (2013.01); *C09K 8/80* (2013.01); *E21B 43/27* (2020.05); *E21B 43/28* (2013.01); *C09K 2208/28* (2013.01); *C09K 2208/32* (2013.01)

(58) Field of Classification Search
None
See application file for complete search history.

(56) References Cited

U.S. PATENT DOCUMENTS

| | | | |
|---|---|---|---|
| 3,768,565 A * | 10/1973 | Persinski | C09K 8/62 137/13 |
| 3,998,272 A | 12/1976 | Maly | |
| 7,211,548 B2 | 5/2007 | Munoz, Jr. | |
| 7,261,160 B2 | 8/2007 | Welton et al. | |
| 7,455,112 B2 | 11/2008 | Moorehead et al. | |
| 7,553,800 B2 | 6/2009 | Munoz, Jr. | |
| 7,906,464 B2 | 3/2011 | Davidson | |
| 7,994,101 B2 | 8/2011 | Cassidy et al. | |

(Continued)

FOREIGN PATENT DOCUMENTS

| | | |
|---|---|---|
| WO | 2001/018147 | 3/2001 |
| WO | 2008/071928 | 6/2008 |
| WO | 2015/171130 | 11/2015 |

OTHER PUBLICATIONS

U.S. Appl. No. 17/899,964, filed Aug. 31, 2022.

(Continued)

*Primary Examiner* — Andrew Sue-Ako
(74) *Attorney, Agent, or Firm* — Thomas Rooney; C. Tumey Law Group PLLC (57) ABSTRACT

A variety of methods, systems, and compositions are disclosed, including, in one example, a method that includes: introducing a treatment fluid into a wellbore extending into a subterranean formation, wherein the treatment fluid comprises: water; an acid; a corrosion inhibitor; and a friction reducer having a vinyl phosphonic acid moiety, an acrylic acid moiety, a vinyl sulfonate moiety, a diallyl moiety, or an acrylamide moiety; and flowing at least a portion of the treatment fluid into the subterranean formation, wherein the pressure required to achieve a given flow rate of the treatment fluid into the subterranean formation is reduced by at least 1% as compared to the pressure required to achieve the given flow rate of the treatment fluid in the subterranean formation without the friction reducer.

19 Claims, 3 Drawing Sheets

(56) References Cited

U.S. PATENT DOCUMENTS

| | | |
|---|---|---|
| 8,058,211 B2 | 11/2011 | Cassidy et al. |
| 8,109,335 B2 | 2/2012 | Luo et al. |
| 8,551,924 B2 | 10/2013 | Rickman et al. |
| 8,584,757 B2 | 11/2013 | Reyes |
| 8,592,353 B2 | 11/2013 | Dalrymple et al. |
| 8,618,026 B2 | 12/2013 | Ezell et al. |
| 8,714,249 B1 | 5/2014 | Tang |
| 8,727,005 B1 | 5/2014 | Gamage et al. |
| 8,763,703 B2 | 7/2014 | Saini et al. |
| 8,853,137 B2 | 10/2014 | Todd et al. |
| 9,834,716 B2 | 12/2017 | Chung et al. |
| 11,149,188 B2 | 10/2021 | Recio, III et al. |
| 11,274,240 B2 | 3/2022 | Benoit et al. |
| 11,326,091 B2 | 5/2022 | Li et al. |
| 11,384,281 B2 | 7/2022 | Recio, III et al. |
| 11,518,929 B2 | 12/2022 | Recio, III et al. |
| 2003/0054962 A1* | 3/2003 | England ............... C09K 8/62 507/117 |
| 2003/0125215 A1 | 7/2003 | Schwartz et al. |
| 2006/0180308 A1 | 8/2006 | Welton et al. |
| 2009/0156432 A1 | 6/2009 | Cassidy et al. |
| 2011/0061869 A1 | 3/2011 | Abass et al. |
| 2013/0284434 A1 | 10/2013 | Marvel |
| 2014/0096971 A1 | 4/2014 | Keizer et al. |
| 2015/0060145 A1 | 3/2015 | Breese et al. |
| 2019/0211255 A1 | 7/2019 | Tellakula |
| 2019/0241796 A1* | 8/2019 | Mast ................. C09K 8/905 |
| 2021/0079292 A1* | 3/2021 | Purdy ................ E21B 43/27 |
| 2021/0310344 A1 | 10/2021 | Al-Nakhli et al. |
| 2022/0243016 A1* | 8/2022 | Dawson ................ C08J 3/05 |

OTHER PUBLICATIONS

Michael A. Reynolds, "A Technical Playbook for Chemicals and Additives Used in the Hydraulic Fracturing of Shales", Energy Fuels 2020, 34, 15106-15125, ACS Publications.

Sameer Al-Hajri, Perspective Review of Polymers as Additives in Water-Based Fracturing Fluids, ACS Omega 2022, 7, 7431-7443, ACS Publications.

Zheng Mao, Nanomaterials and Technology Applications for Hydraulic Fracturing of Unconventional Oil and Gas Reservoirs: A State-of-the-Art Review of Recent Advances and Perspectives, ACS Omega 2022, 7, 29543-29570, ACS Publications.

International Search Report and Written Opinion for International Patent Application No. PCT/US2024/012632 dated May 28, 2024. PDF file. 10 pages.

* cited by examiner

FRICTION REDUCTION OF ACIDIC TREATMENT FLUIDS

BACKGROUND

During the drilling, completion, and stimulation of subterranean wells, treatment fluids and crude oil are pumped through wellbores and tubular structures (e.g., pipes, coiled tubing, flowlines, surface pipelines, etc.). A considerable amount of energy may be lost to friction during pumping of these fluids. For example, the fluids may become turbulent or form eddy currents when flowing through wellbore casing or other conduits. As a result of these energy losses, additional horsepower may be needed to achieve the desired treatment. To reduce these energy losses, fluid friction-reducers can be included in these treatment fluids. Fluid friction-reducers are chemical additives that alter fluid rheological properties to reduce friction created within a fluid as it flows through tubulars or other flow paths. Most friction reducers are acid incompatible or intolerant and may lose effectiveness in acidic environments.

BRIEF DESCRIPTION OF THE DRAWINGS

These drawings illustrate certain aspects of some of the embodiments of the present disclosure and should not be used to limit or define the method.

DETAILED DESCRIPTION

Disclosed herein are treatment fluids and methods of treating a subterranean formation and, more particularly, disclosed are methods for treating a subterranean formation with a treatment fluid comprising a friction reducer and acid.

There are many advantages to the methods and compositions as presently disclosed, only some of which are discussed or alluded to herein. One such advantage is that the treatment fluids of the present disclosure may have improved compatibility with acid. In one or more examples, acid fracturing, matrix acidizing, or other wellbore operations involving treatment fluids may be performed while reducing a total amount of head loss and/or an energy requirement of the operations. For example, flow rates of these treatment fluids may be higher than what can normally be achieved using conventional treatment fluids. Other advantages may include good compatibility between friction reducers and corrosion inhibitors, as well as good polymer elongation. Other examples may include an improved ability to pump above a fracture gradient, improved fracture extension, overcoming of conventional pumping pressure limitations, higher pumping rates than those maximally achievable with presently used viscosifying agents.

Treatment fluids of the present disclosure may be used during hydrocarbon resource recovery, such as in matrix acidizing or acid fracturing operations. The treatment fluids may also be used with other forms of energy carriers, such as in geothermal fluids. The treatment fluids may also be used during cleaning of surface pipelines, such as pipelines used for transporting hydrocarbon resources across great distances. Surface pipelines may or may not be connected to a wellbore. The treatment fluids may be used in injector wells, such as an injector well benefiting from an acidizing treatment. In addition, the treatment fluids may be used in wellbore cleanout, coiled tubing procedures, filter cake removal, scale removal, damage removal, hydrate treatment, hydrate inhibition, and open hole diversion, frac-pac clean out, gravel pack clean out, re-fracturing or re-stimulation of previously fractured well, to use non-limiting examples. In general, the treatment fluids generally comprise water, an acid, a corrosion inhibitor, and a friction reducer. In addition to these, various other chemicals or additives may be optionally included in the treatment fluids, as disclosed herein.

Treatment fluids of the present disclosure may be aqueous and/or non-emulsified, having a single aqueous continuous phase. For example, water may be present in a treatment fluid in an amount greater than 60 wt. %, such as from about 60 wt. % to about 99.9 wt. %. Alternatively, from about 60 wt. % to about 75 wt. %, about 75 wt. % to about 85 wt. %, about 85 wt. % to about 95 wt. %, about 95 wt. % to about 99.9 wt. %, or any ranges therebetween. Alternatively, treatment fluids of the present disclosure may, in some examples, be nonaqueous and/or emulsified. The treatment fluids may be used in direct emulsions or invert emulsions. A water-in-oil emulsion may be used, for example, where the treatment fluid comprises a water phase comprising an active acid concentration of 7 wt. % to 28 wt. % HCl and an oleaginous phase. An oleaginous phase may comprise a refined or distillation product such as diesel, xylene, blended or mixed hydrocarbons, naphtha, alkenes, high order ethylenics or olefins, butadiene, isoparaffins, oleic acids, limonene, squalene, and any combination thereof.

As used herein, aqueous fluids may generally include water and, optionally, one or more species dissolved or suspended therein. Water used in a treatment fluid may be derived from any suitable source, and may comprise fresh water, saltwater (e.g., water containing one or more salts dissolved therein like sodium chloride, calcium chloride, potassium chloride, magnesium chloride, soluble sulfate salts, and calcium nitrate, brine, seawater, treated seawater, field water, stream water, groundwater, industrially treated or brackish water, the like, and/or any combination thereof.

The fluids described herein may comprise, without limitation, aqueous fluids, wellbore fluids, reservoir fluids, brines, fresh water, salt water, water from any source, wellbore treatment fluids, production fluids, injection fluids, hydraulic fracturing fluid, enhanced oil recovery fluids, SAGD well fluids, fracturing fluids, proppants, cementing fluids, spacer fluids, injection fluids, clays, sands, production fluids, seawater, any species dissolved or suspended therein (e.g., low density solids, high density solids, etc.), and any combinations thereof.

The treatment fluids may comprise one or more acids. Acids may be inorganic or organic acids, including, for example: hydrochloric acid; hydrobromic acid; hydroiodic acid; hydrofluoric acid; nitric acid; nitrous acid; carbonic acid; phosphoric acid; mineral acids including oxoacids and oxyhalides such as $H_xXO_n$, where n=1, 2, 3, 4 and X=F, Cl, Br, I, or i=1, 2, 3 and X=B, C, Si, N, P, S, Se, Sb and n=3, 4 or 5 and any chemically allowable combinations thereof. Other examples include: methane sulfonic acid; formic acid; acetic acid; chloroacetic acid; di-chloroacetic acid; trichloroacetic acid; polyhydroxycarboxylic acids like citric acid; glycolic acid; hydroxyacetic acid; lactic acid; 3-hydroxypropionic acid; aspartic acid; gluconic acid; glucaric acid; or aminopolycarboxylic acids such as ethylenediaminetetraacetic acid (EDTA) or other chelants such as hydroxyethylethylenediaminetriacetic acid (HEDTA), tetrasodium glutamate diacetate (GLDA), methylglycinediacetic acid (MGDA), N-(2-hydroxyethyl)iminodiacetic acid (HEIDA). Other examples include, for example: alkylated phosphonic acid such as an acidic or a neutralized version of N-(Phosphonomethyl)iminodiacetic acid (PMIDA) or salts thereof; N-(carboxymethyl)-N-(phosphonomethyl)glycine; glycine; N,N'-1,2-ethanediylbis(N-(phosphonomethyl); glyphosine; sodium aminotris(methylenephosphonate); N-(2-hydroxyethyl)iminobis (methylphosphonic acid); phosphonic acid; P,P'-((2-propen-1-ylimino)bis(methylene))bis-; phosphonic acid; P,P',P'''(nitrilotris(methylene))tris-(nitrilotris(methylene))trisphosphonic acid; ((methylimino)-dimethylene)bisphosphonic acid; phosphonic acid, P,P',P''',P''''-(oxybis(2,1-ethanediylnitrilobis-(methylene))tetrakis-((propylimino)bis(methylene))diphosphonic acid; phosphonic acid; P,P',P'''-(nitrilotris(methylene))tris-(ethylenedinitrilo)-tetramethylenephosphonic acid; ethylene-bis(nitrilodimethylene)tetraphosphonic acid; (ethylenebis(nitrilobis(methylene)))tetrakisphosphonic acid; tetrasodium tetrahydrogen(ethane-1,2-diylbis(nitrilobis(methylene)))tetrakisphosphonate; 6-(bis(phosphonomethyl)amino) hexanoic acid; (phenylmethyl)imino)bis(methylene)bisphosphonic acid, 1,2,4-phosphonobutanetricarboxylic acid (PBTCA), aminotris(methylenephosphonic acid) (ATMP), ethylenediaminetetra(methylenephosphonic acid) (EDTMP), diethylenetriaminepenta(methylenephosphonic acid) (DTPMP), hexamethylenediaminetetramethyleneph-osphonic acid (HDTMP), bishexamethylenetriaminepenta (methylenephosphonic acid) (BHMTMP), 2-hydroxyphosphono dicarboxylic acid; a sodium, potassium, or ammonium salt of any group member herein, and mixtures thereof, or phosphonate ester derivatives. Acid may be individually or cumulatively present in the treatment fluid in an amount from about 1 wt. % to about 45 wt. %. Alternatively, from about 1 wt. % to about 10 wt. %, about 10 wt. % to about 15 wt. %, about 15 wt. % to about 20 wt. %, about 20 wt. % to about 25 wt. %, about 25 wt. % to about 30 wt. %, about 30 wt. % to about 35 wt. %, about 35 wt. % to about 40 wt. %, about 40 wt. % to about 45 wt. %, or any ranges therebetween.

The treatment fluids may include a friction reducer. A friction reducer may reduce the amount of friction experienced by a fluid, thereby reducing the amount of energy required to pump the fluid from the surface to a treated region of a formation and allowing for greater pumping rates and/or lower pumping pressures to achieve those rates. Friction reducers may include, for example, an acrylamide-based compound, compounds having a diallyl functional group, vinyl sulfonate-based compounds, acrylic acid-based compounds, vinyl phosphonic acid-based compounds, or any combinations thereof.

An acrylamide-based (neutral) compound may include, for example: 2-propenamide; methacrylamide, N,N-dimethylacrylamide; N-isopropylacrylamide; 2,3,3-trichloroacrylamide; N,N-methylenebisacrylamide; N,N-ethylenebis (acrylamide); piperazine diacrylamide; N-(isobutoxymethyl)acrylamide; N-hydroxyethyl acrylamide; N-hydroxymethyl acrylamide; N-(3-methoxypropyl) acrylamide; 3-(4-methylphenyl)acrylamide, N-(tert-butyl) acrylamide; N-[(diethylamino)methyl]acrylamide; N-[(diethylamino)methyl]acrylamide chloride; N-(1-pyrrolidinylmethyl)acrylamide; N-(1-pyrrolidinylmethyl)acrylamide hydrochloride; N-[2-(acryloylamino)phenyl]acrylamide, 3-Phenyl-N-(4-pyridinyl)acrylamide, N-allyl-3-(2-chlorophenyl)acrylamide; 2-methyl-N-naphthalen-1-yl-acrylamide; N-methoxy-n-methyl-3-phenyl-acrylamide; N-[2-(1H-indol-3-yl)ethyl]acrylamide; 3-(2-chlorophenyl)-n-(2-(4-morpholinyl)ethyl)acrylamide; N-3,5-dichloro-2-hydroxy-4-methyl-phenyl)-2-methyl acrylamide; 3-(4-chloro-phenyl)-n-(2-morpholin-4-yl-ethyl)-acrylamide; 3-(acrylamido)phenylboronic acid; 2-acrylamido-2-methyl-1-propanesulfonic acid; N-vinylsuccinimide; 1-ethenyl-2-imidazolidinone; 1-ethenyl-1,3-dihydro-2H-imidazol-2-one; 1-ethenyl-1,3-dihydro-2H-imidazol-2-one, N,N-(2-hydroxyethyl)-2-propenamide, N,N-Bis(2-hydroxyethyl)-2-methyl-2-propenamide, and any combinations thereof.

An acrylamide-based (charged) polymer may include, for example: N,N,N-Trimethyl-2-[(1-oxo-2-propen-1-yl) amino]ethanaminium chloride; N,N,N-Trimethyl-2-[(1-oxo-2-propen-1-ylamino]ethanaminium sulfate; N,N,N-Trimethyl-2-[(1-oxo-2-propen-1-yl)amino]ethanaminium hydroxide; N,N,N-Trimethyl-2-[(1-oxo-2-propen-1-yl) amino]propanaminium chloride; N,N,N-Trimethyl-2-[(1-oxo-2-propen-1-yl)amino]propanaminium sulfate; N,N,N-Trimethyl-2-[(1-oxo-2-propen-1-yl)amino]propanaminium hydroxide; N,N,N-Trimethyl-2-[(1-oxo-2-propen-1-yl) amino]butanaminium chloride; N,N,N-Trimethyl-2-[(1-oxo-2-propen-1-yl)amino]butanaminium sulfate; N,N,N-Trimethyl-2-[1-oxo-2-propen-1-yl)amino]butanaminium hydroxide; N,N,N-Trimethyl-2-[(1-oxo-2-propen-1-methyl) amino]ethanaminium chloride; N,N,N-Trimethyl-[(1-oxo-2-propen-1-methyl)amino]ethanaminium sulfate; N,N,N-Trimethyl-2-[(1-oxo-2-propen-1-methyl)amino] ethanaminium hydroxide; N,N,N-Trimethyl-2-[(1-oxo-2-propen-1-methyl)amino]propanaminium chloride; N,N,N-Trimethyl-2-[(1-oxo-2-propen-1-methyl)amino] propanaminium sulfate; N,N,N-Trimethyl-2-[(1-oxo-2-propen-1-methyl)amino]propanaminium hydroxide; N,N,N-Trimethyl-2-[(1-oxo-2-propen-1-methyl)amino] butanaminium chloride; N,N,N-Trimethyl-2-[(1-oxo-2-propen-1-methyl)amino]butanaminium sulfate; N,N,N-Trimethyl-2-[(1-oxo-2-propen-1-methyl)amino] butanaminium hydroxide; N,N,N-Trimethyl-4-[(2-1-oxo-2-propen-1-yl)amino]benzenemethanaminium; N,N,N-Trimethyl-4-[(2-methyl-1-oxo-2-propen-1-yl)amino] benzenemethanaminium chloride; N,N,N-Trimethyl-4-[(2-methyl-1-oxo-2-propen-1-yl)amino] benzenemethanaminium sulfate; N,N,N-Trimethyl-4-[(2-methyl-1-oxo-2-propen-1-yl)amino] benzenemethanaminium hydroxide; and any combinations thereof.

Compounds having a diallyl functional group may include, for example: a diallyl sulfide; diallyl sulfone, 3-(2-propen-1-ylsulfonyl)-1-propene; diallyl dimethylammonium; diallyl dimethylammonium chloride; diallyl dimethylammonium sulfate; diallyl dimethylammonium hydroxide; N,N-Bis(2-hydroxyethyl)-N-2-propen-1-yl-2-propen-1-aminium. Other examples include N,N-Bis(2-hydroxyethyl)-N-2-propen-1-yl-2-propen-1-aminium chloride; N,N-Bis(2-hydroxyethyl)-N-2-propen-1-yl-2-propen-1-aminium sulfate; N,N-(2-hydroxyethyl)-N-2-1-yl-2-propen-1-aminium hydroxide; and any combinations thereof.

Vinyl sulfonate-based compounds may include, for example: 2-acrylamido-2-methyl-1-propanesulfonic acid sodium salt; vinyl sulfonic acid; vinyl sulfonic acid sodium salt; 4-vinylbenzenesulfonic acid; 4-vinylbenzenesulfonic acid sodium salt; 5-ethenyl-1,3-benzenedisulfonic acid;

5-ethenyl-1,3-benzenedisulfonic acid sodium salt; 5-ethenyl-2-hydroxy-1,3-benzenedisulfonic; 2-acrylamidoethanesulfonic acid; 2-acrylamidoethanesulfonic acid sodium 2-salt; acrylamidoethanesulfonic acid ammonium salt; 2-methyacylamidoethanesulfonic acid; 3-acrylamidopropanesulfonic acid; 2-acrylamidopropanesulfonic acid sodium salt; 2-acrylamidopropanesulfonic acid ammonium salt; 4-acrylamidobutanesulfonic acid; 2-acrylamidobutanesulfonic acid sodium salt; 2-acrylamidobutanesulfonic acid ammonium salt; and any combinations thereof.

An acrylic acid based compounds may include, for example: acrylic acid; acrylic acid mono-valent salt; acrylic acid di-valent salt; acrylic acid tri-valent salt; methyl acrylate; ethyl acrylate, n-propyl acrylate; isopropyl acrylate; n-butyl acrylate; sec-butyl acrylate; tert-butyl acrylate; 2-methyl-2-propionic acid; ethyl methacrylate; n-propyl methacrylate; isopropyl methacrylate; n-butyl methacrylate; sec-butyl methacrylate; tert-butyl methacrylate; ethyoxylated acrylic acid; ethoxylated methacrylate; propoxylated acrylic acid; propoxylated methacrylate; and any combinations thereof.

An acrylic acid-based (charged) compound may include, for example: (2-acryloyloxyethyl-trimethyl ammonium chloride; (2-acryloyloxyethyl)trimethyl ammonium chloride sulfate; (2-acryloyloxyethyl)trimethyl ammonium hydroxide; N,N,N-Trimethyl-3-[(1-oxo-2-propen-1-yl)oxy]-1-propanaminium chloride; N,N,N-Trimethyl-3-[(1-oxo-2-propen-1-yl)oxy]-1-propanaminium sulfate; N,N,N,-Trimethyl-3-[(1-oxo-2-propen-1-yl)oxy]-1-propanaminium hydroxide; N,N,N-Trimethyl-4-[(1-oxo-2-propen-1-yl)oxy]-1-butanaminium chloride; N,N,N-Trimethyl-4-[(1-oxo-2-propen-1-oxy]-1-butanaminium sulfate; N,N,N-Trimethyl-4-[(1-oxo-2-propen-1-yl)oxy]-1-butanaminium hydroxide; (2-methacryloyloxyethyl)trimethyl ammonium chloride; (2-methacryloyloxyethyl)trimethyl ammonium chloride sulfate; (2-methacryloyloxyethyl)trimethyl ammonium chloride; (2-methacryloyloxyethyl)trimethyl ammonium chloride sulfate; (2-methacryloyloxyethyl)trimethyl ammonium chloride; (2-methacryloyloxyethyl)trimethyl ammonium chloride sulfate; (2-methacryloyloxyethyl)trimethyl ammonium chloride; (2-methacryloyloxyethyl)trimethyl ammonium chloride sulfate; (2-methacryloyloxyethyl)trimethyl ammonium chloride; (2-methacryloyloxyethyl)trimethyl ammonium chloride sulfate; (2-methacryloyloxyethyl)trimethyl ammonium chloride sulfate; (2-methacryloyloxyethyl)trimethyl ammonium hydroxide; N,N,N-Trimethyl-3-[(1-oxo-2-propen-1-yl)oxy]1-propanaminium chloride; N,N,N,-Trimethyl-3-[(1-oxo-2-propen-1-methyl)oxy]-1-propanaminium sulfate; N,N,N-Trimethyl-3-[(1-oxo-2-propen-1-methyl)oxy]-1-propanaminium hydroxide; N,N,N-Trimethyl-4-[(1-oxo-2-propene-1-methyl)oxy]-1-butanaminium chloride; N,N,N-Trimethyl-4-[(1-oxo-2-propen-1-methyl)oxy]-1-butanaminium sulfate; N,N,N-Trimethyl-4-[(1-oxo-2-propen-1-methyl)oxy]-1-butanaminium hydroxide; and any combinations thereof.

A vinyl phosphonic acid-based compound may include, for example: vinylphosphonic acid; vinylphosphonic acid mono-valent salt; vinylphosphonic acid di-valent salt; vinylphosphonic acid tri-valent salt; (4-Ethenylphenyl)phosphonic acid; P-(4-Ethenylphenyl)phosphonic acid mono-valent salt; P-(4-Ethenylphenyl)phosphonic acid divalent salt; P-(4-Ethenylphenyl)phosphonic acid tri-valent salt; P-(2-Ethenylphenyl)phosphonic acid; P-2-Ethenylphenyl)phosphonic acid mono-valent salt; P-(2-Ethenylphenyl)phosphonic acid di-valent salt; P-2-Ethenylphenyl)phosphonic acid tri-valent salt; P-(3-Ethenylphenyl)phosphonic acid; P-(3-Ethenylphenyl)phosphonic acid mono-valent salt; P-(3-Ethenylphenyl)phosphonic acid di-valent salt; P-(3-Ethenylphenyl)phosphonic acid tri-valent salt; and any combinations thereof.

Other friction reducers may include, for example, a viscoelastic polymer. A viscoelastic polymer may have a molecular weight from about 5,000 kilodaltons to about 20,000 kilodaltons. Alternatively, from about 10,000 to about 13,000 kilodaltons, about 13,000 kilodaltons to about 16,000 kilodaltons, about 16,000 kilodaltons to about 19,000 kilodaltons, about 19,000 kilodaltons to about 25,000 kilodaltons, or any ranges therebetween.

Any of the above-listed friction reducers may be present in a treatment fluid in an amount between about 100 ppm to about 1000 ppm. Alternatively, from about 100 ppm to about 200 ppm, about 200 ppm to about 400 ppm, about 400 ppm to about 600 ppm, about 600 ppm to about 800 ppm, about 800 ppm to about 1000, or any ranges therebetween. In some examples, in an amount from about 0.01 wt. % to about 10 wt. %, about 0.01 wt. % to about 1 wt. %, about 1 wt. % to about 5 wt. %, about 5 wt. % to about 10 wt. %, or any ranges therebetween.

The treatment fluid may comprise a corrosion inhibitor. Corrosion inhibitors may mitigate the corrosive effects of the acid on the metal surfaces of downhole or surface equipment, such as wellbore casings and tubing or internal regions of pumps, tanks, flowlines, etc. Suitable corrosion inhibitors may include, for example: a cinnamaldehyde compound or a derivative thereof; an acetylenic compound such as acetylenic alcohols or the like; a quaternary alkyl or aryl ammonium compound; a urea or thiourea containing monomeric, oligomeric, or polymeric compound; and any combinations thereof. The corrosion inhibitor may be included in the treatment fluid in an amount from about 0.005 wt. % to about 5 wt. %. Alternatively, from about 0.005 to about 0.02 wt. %, about 0.02 wt. % to about 1 wt. %, about 1 wt. % to about 5 wt. %, or any ranges therebetween.

A cinnamaldehyde compound or derivative may include, for example, dicinnamaldehyde, p-hydroxycinnamaldehyde, p-methylcinnamaldehyde, p-ethylcinnamaldehyde, p-methoxy cinnamaldehyde, p-dimethylaminocinnamaldehyde, p-diethylaminocinnamaldehyde, p-nitrocinnamaldehyde, o-nitrocinnamaldehyde, o-allyloxycinnamaldehyde, 4-(3-propenal)cinnamaldehyde, p-sodium Sulfocinnamaldehyde, p-trimethylammoniumcinnamaldehyde Sulfate, p-trimethylammoniumcinnamaldehyde, o-methylsulfate, p-thiocyano cinnamaldehyde, p-(S-acetyl)thiocinnamaldehyde, p-(S N. N-dimethylcarbamoylthio) cinnamaldehyde, p-chlorocinnamaldehyde, C.-methylcinnamaldehyde, B-methylcinnamaldehyde, C.-chlorocinnamaldehyde, C.-bromo cinnamaldehyde, C.-butylcinnamaldehyde, C.-amylcinnamal dehyde, C.-hexylcinnamaldehyde, C-bromo-p-cyano-cinnamaldehyde, O-ethyl-p-methylcinnamaldehyde, p-methyl-C-pentylcinnamaldehyde, cinnamaloxime, cinnamonitrile, 5-phenyl-2,4-pentadienal, 7-phenyl-2,4,6-heptatrienal, or any combination thereof.

An acetylenic compound or acetylenic alcohol may include, for example, methyl butynol, methyl pentynol, hexynol, ethyl octynol, propargyl alcohol, benzylbutynol, ethynylcyclohexanol, ethoxyacetylenics, propoxyacetylenics, and mixtures thereof. Other examples of these types of alcohols may include hexynol, propargyl alcohol, methylbutynol, ethyl octynol, propargyl alcohol ethoxylate, propargyl alcohol propoxylate, or an acetylenic alcohol of octyl-alcohol, propargyl-alcohol, 2-benzoyl-allyl alcohol, 3-phenyl-2-propyn-1-ol, or any combinations thereof.

Other corrosion inhibitors may include, for example: a quaternary alkyl or aryl ammonium compound; a pyridinium compound; an imidazolium compound. Other examples include, for example: N-alkyl, N-cycloalkyl, an N-alkylarylpyridinium halide, N-alkyl, N-cycloalkyl, a N-alkylarylquinolinium halide; a polymer that incorporates into its structure allylamine; vinylamine; lysine; diallyldimethylammonium; vinylpyridine; quinoline (PVQ); vinylpyrrolidone (PVP); vinylcaprolactam (PVC); derivatized cellulose; polyethylenimine (PEI); or polypropylenimine (PPI). Other examples include, for example: a thiol compound comprising thiosorbitol; hydrogen sulfide; methanethiol; thioethanol; 1-thio-2-butanol; 1,2-ethanedithiol; 1,3-propanedithiol; 2-aminoethanethiol; 2-mercaptobenzothiazole; 2-mercaptothiazoline; glycol dimercaptoacetate; mercaptosuccinic acid; thioglycerol; thiolactic acid; cysteine; 6-amino-3-mercaptothiazole; 6-ethoxy-2-mercaptobenzothiazole; glycerol monothioglycolate; monoethanolamine thioglycolate; methyl thioglycolate; isooctyl thioglycolate; ethyl thioglycolate; 2-ethyl hexyl thioglycolate; thioglycolic acid; and any combinations thereof. Other examples include, for example unsaturated hydrocarbons that are classified as: (1) terpenes which contain cyclic components, and which can include such as citral, ocimene, pinene, limonene; or (2) terpenoids such as squalene which are primarily aliphatic.

In some examples, the effectiveness of a corrosion inhibitor may be amplified by an intensifier. Suitable intensifiers may include, for example, potassium iodide, sodium iodide, formic acid, cuprous iodide, antimony-based intensifiers, bismuth-based intensifiers, molybdenum-based intensifiers, triphenylphosphine, triethylphosphine, trimethylphosphine, and any combinations thereof.

The treatment fluid may include a surfactant. A suitable surfactant may include, for example, an anionic surfactant, a cationic surfactant, a non-ionic surfactant, a zwitterionic surfactant, an amphoteric surfactant, or any combination thereof.

An anionic surfactant may include, for example, sulfates, sulfonates, phosphates, phosphonates, carboxylates, and their derivatives. For example, a surfactant may include a metalated, alkyl-, alkenyl, aryl-sulfate such as: ammonium lauryl sulfate, sodium lauryl sulfate, and related alkyl-ether sulfates such as sodium laureth sulfate and sodium myreth sulfate; a surfactant may include a metalated, alkyl-, alkenyl, aryl-sulfonate such as: sodium alkylbenzene sulfonate. Other anionic surfactants include docusate (dioctyl sodium sulfosuccinate), perfluorooctanesulfonate, perfluorobutanesulfonate, A surfactant may also include metalated alkyl-, alkenyl, aryl-phosphates such as alkyl-aryl ether phosphates, metalated alkyl-, alkenyl, aryl-phosphonates such as alkylaryl phosphonates, alkyl ether phosphates, alkyl phosphonates. Carboxylates may include metalated, alkyl-, alkenyl, aryl-carboxylates such as: sodium stearate, sodium lauroyl sarcosinate, and carboxylate-based fluorosurfactants such as perfluorononanoate and perfluorooctanoate. Other specific examples of anionic surfactants include, for example, sodium, potassium, and ammonium salts of long chain alkyl sulfonates and alkyl aryl sulfonates (e.g., sodium dodecylbenzene sulfonate), taurates, dialkyl sodium sulfosuccinates (e.g., sodium dodecylbenzene sulfonate, sodium bis-(2-ethylthioxyl)-sulfosuccinate), sodium decylsulfate, alkyl sulfates (e.g., sodium lauryl sulfate), alkyl sulfonates (e.g., methyl sulfonate, heptyl sulfonate, decylbenzene sulfonate, dodecylbenzene sulfonate), alkoxylated sulfates, alkoxylated fatty acids, dodecylbenzenesulfonic acid, sodium cocoyl isethionate, glycol monobutyl ether, alpha-olefin sulfonate, alkylether sulfates, alkyl phosphonates, alkane sulfonates, fatty acid salts, acrylsulfonic acid salts.

A cationic surfactant may include, for example, octenidine dihydrochloride, or a benzalkonium halide such as: cetyltrimethylammonium chloride, cetyl dimethylbenzyl ammonium chloride, trimethyltallowammonium chloride, dimethyldicocoammonium chloride. Cetyl trimethyl ammonium bromide benzalkonium chloride, cocamidopropyl betaine, lauryl dimethylamine oxide, dodecylpyridinium chloride, stearalkonium chloride, hexadecylpyridinium chloride, polyquaternium, behentrimonium chloride, and trimethylammonium bromide. Other examples of cationic surfactants include, for example, alkyl ammonium bromides. Further modifications can be made in order to introduce cationic character to suitable starting materials such as bis(2-hydroxyethyl)tallow amine, bis(2-hydroxyethyl)erucylamine, bis(2-hydroxyethyl)coco-amine, by means of alkoxylation, for example.

A non-ionic surfactant may include, for example, compounds containing hydrophilic groups containing oxygen, the hydrophilic groups bonded to hydrophobic moieties. For example, non-ionic surfactants may include ethoxylated sorbitan esters (polysorbates), such as polysorbate 80. Other non-ionic examples may include triton X-100, as well as ethoxylated alcohols. For example, ethoxylated alcohols may include alkylphenol ethoxylates, linear or branched alcohol ethoxylates, nonylphenol ethoxylates, octylphenol ethoxylates, stearyl alcohol ethoxylates, lauryl alcohol ethoxylates, cetyl alcohol ethoxylates, fatty alcohol ethoxylates, and the like. Other non-ionic examples include sorbitan esters such as sorbitan monostearate, sorbitan tristearate, or sorbitan monolaurate. Other non-ionic surfactants may include, for example, polyglucosides, such as alkyl polyglucosides, alkoxylates of polymeric phenols, alkylphenols, bisphenols, sugars, amines, imines, imidazolines, and simple and complex esters or crosslinked versions thereof.

Other surfactants may include, for example, zwitterionic surfactants. Some zwitterionic surfactants include amphoteric surfactants. Non-limiting examples of amphoteric surfactants may include, for example, betaines (e.g., lauryl betaine, oleamidopropyl betaine, cetyl betaine, cocamidopropyl betaine, etc.), amine oxides (e.g., cocamine oxide, laurylamine oxide, dodecylamine oxide, etc.), sultaines (e.g., cocamidopropyl hydroxysultaine, lauryl hydroxysultaine, etc.), amphoacetates (e.g., cocamphoacetate and disodium cocamphoacetate), alkylamphoacetates (e.g., disodium lauryl amphoacetate and disodium cocoamphodiacetate, etc.), and the like. Amphoteric surfactants may include a cationic moiety (e.g., secondary amine, tertiary amine, quaternary ammonium cation, etc.) as well as an anionic moiety (e.g., sulfonates, sultaine, etc.). Other examples include 3-[(3-cholamidopropyl)dimethylammonio]-1-propanesulfonate, phosphatidylserine, phosphatidylethanolamine, and phosphatidylcholine.

Some zwitterionic are nonamphoteric and do not undergo significant charge changes over a wide range of pH values. Non-limiting examples of nonamphoteric surfactants may include betaine esters (e.g., coco-betaine ester, lauryl-betaine ester, and oleoyl-betaine ester, etc.), phosphobetaines (e.g., phosphatidylcholine, sphingomyelin, etc.), and imadazolines (cocamidopropyl hydroxy sultaine, lauryl hydroxy sultaine, etc.).

A surfactant may, in some examples, include a secondary, tertiary, or quaternary ammonium cation. Specific examples of tertiary amines include, for example, tertiary amine oxides (e.g., lauryldimethylamine oxide, myristamine oxide, etc.). Specific examples of quaternary ammonium salts include, for example, choline hydroxide, cetrimonium bromide, cetylpyridinium chloride, benzalkonium chloride, benzetheonium chloride, dimethyldioctadecylammonium chloride, dioctadecyldimethylammonium bromide, fatty amine ethoxylate quat surfactants, diamine gemini surfactants such as those obtained from alkynyl compounds, and any combinations thereof.

In some examples, a surfactant may include primary, secondary, or tertiary amines. Specific examples may include, dimethyl cocoamine oxide, and lauryl dimethylamine oxide.

In one or more examples, a surfactant may include a synthetic surfactant. Specific examples of synthetic surfactants may include, for example, sulfosuccinates (e.g., dialkyl sodium sulfosuccinate).

Other surfactants may include, for example, linear or branched alkylbenzene sulfonates, lignin sulfonates, siloxane surfactants (e.g., polydimethylsiloxane, silsesquioxane, siloxane-polyether copolymers, polyethyleneoxide modified siloxanes, fluorinated siloxane surfactants, etc.), tall-oil-derived surfactants (e.g., reaction product of tall oil fatty acids with diethylenetriamine, maleic anhydride, tetraethylenepentamine and triethylenetetramine), per- and polyfluoroalkyl substances, fluorinated surfactants (e.g., fluorinated polymer surfactants, cationic fluorosurfactants with cationic and anionic salt moieties, etc.), viscoelastic surfactants (e.g., methyl ester sulfonates, ethoxylated amines), polymeric alkoxylates of phenolic resins, bis-phenol polymers, esters and complex esters thereof, low molecular-weight aliphatic moieties, polar organic functional groups such as amidoamines, amines, amides, silicates, glycols, polyacrylamide, partially hydrolyzed polyacrylamide, polyvinylpyrrodolidone, quaternized alkyl oraryl molecules, conjugates or derivatized macromolecules, oxidizer or oxidizing agents, reducer or reducing agents, metal (oxy)anion salts where the metal is a multivalent (n) cation (n=+2, +3, +4, +5, +6, +7) and the anion is a halide, sulfur or selenium, nitrogen or phosphorous, and combinations thereof. In another example, a surfactant may comprise 1-Acrylamido-2-methylpropanesulfonic acid (AMPS) terpolymer. AMPS terpolymers may be formed from three monomers: AMPS, acrylic acid, and a third monomer, for example, acrylamide, ethylene glycol dimethacrylate, or N,N'-methylenebisacrylamide.

A surfactant may be present in the treatment fluids in an amount from about 0.01 wt. % to about 35 wt. %. Alternatively, from about 0.01 wt. % to about 0.1 wt. %, about 0.1 wt. % to about 1 wt. %, about 1 wt. % to about 5 wt. %, about 5 wt. % to about 10 wt. %, about 10 wt. % to about 15 wt. %, about 15 wt. % to about 20 wt. %, about 20 wt. % to about 35 wt. %, and any ranges therebetween.

The treatment fluids may include a diverter agent. A diverter agent may include, for example, inorganic materials such as rock salts and polymeric materials such as starch or polyester. A diverter agent may include, for example, a aliphatic polyester, polylactic acid, polylactide, polyvinyl alcohol, plasticized polyvinyl alcohol, polysaccharides, lignosulfonates, chitins, chitosans, proteins, proteinous materials, fatty alcohols, fatty esters, fatty acid salts, a naphthalene, a clean tar, a starch, a dextran, a cellulose, a poly(maleic anhydride), a poly(adipic anhydride), a poly (suberic anhydride), a poly(sebacic anhydride), a poly(dodecanedioic anhydride), a poly(benzoic anhydride), poly (glycolides), poly(ε-caprolactones), polyoxymethylene, polyurethanes, poly(hydroxybutyrates), poly(anhydrides), aliphatic polycarbonates, polyvinyl polymers, acrylic-based polymers, poly(amino acids), poly(aspartic acid), poly(alkylene oxides), polyphosphazenes, poly(orthoesters), poly (hydroxy ester ethers), polyether esters, polyester amides, polyamides, polyhydroxyalkanoates, polyethyleneterephthalates, polybutyleneterephthalates, polyethylenenaphthalenates, a montanyl alcohol, a tert-butylhydroquinone, a cholesterol, a cholesteryl nonanoate, a benzoin, a borneol, an exonorborneol, a glyceraldehyde triphenylmethanol, a dimethyl terephthalate, a camphor, a cholecalciferol, a ricinoleyl alcohol, a 1-heptacosanol, a 1-tetratriacontoanol, a 1-dotriacontanol, a 1-hentriacontanol, a 1-tricontanol, a 1-nonacosanol, a 1-octasanol, a 1-hexacosanol, a 1,17-heptadecanediol, a 1,18-octadecanediol, a 1,19-nonadecanediol, a 1,20-eicosanediol, a 1,21-heneicosanediol, a 1,22-docosanediol, a myricyl alcohol, prednisolone acetate, cellobiose tetraacetate, terephthalic acid dimethyl ester, or any combinations thereof. A diverter agent may be self-degrading. Where used, a diverter agent may at least partially plug a permeable zone in the subterranean formation, thereby diverting at least a portion of a fluid to less permeable sections of the formation.

The treatment fluid may include a scavenger. A scavenger may include, for example, an $H_2S$ scavenger, a $CO_2$ scavenger, an $O_2$ scavenger, an acid scavenger, or a combination thereof. Scavengers may serve to remove or neutralize unwanted substances or contaminants from the wellbore or a wellbore fluid.

The treatment fluid may include a chelating agent. A chelating agent may include, for example, ammonium, hydroxyethylenediaminetetraacetic acid (EDTA), N-(2-hydroxethyl)ethylenediaminetriacetic acid (HEDTA), hydroxyethyliminodiacetic acid (HEIDA), methylglycine diacetic acid (MGDA), L glutamic acid, N,N-diacetic acid (GLDA), ethylenediaminedisuccinic acid (EDDS), beta-alaninediacetic acid (beta-ADA), diethylenetriaminepentaacetic acid (DTPA), cyclohexylenediaminetetraacetic acid (CDTA), nitrilotriacetic acid (NTA), diphenylaminesulfonic acid (DPAS), phosphonic acid, alkylphosphonic acids or phosphonate salts where the alkyl group is any that provides sufficient aqueous solubility in the pH range of interest, citric acid, iminodiacetic acid, gluconic acid, and ammonium, alkali (Group I metal) or alkaline-earth (Group 2 metal) salts thereof, and combinations thereof. Factors to consider when selecting a chelating agent may include pH, temperature, ionic strength, and/or solubility.

The treatment fluid may include a scale inhibitor. A scale inhibitor may include, for example, polyphosphates, phosphate esters, phosphonates, phosphonate esters, polyacrylic acid and salts thereof, and other carboxylic acid-containing polymers. A scale inhibitor may serve to prevent or slow the formation of scale on the inner surface of a wellbore casing.

The treatment fluid may include a viscosifier. A viscosifier may include, for example, an arganophilic bentonite, an organophilic attapulgite, a polysaccharide, a biopolymer such as xanthan or succinoglycan, a cellulose derivate such as hydroxyethylcellulose, and guar and its derivatives such as hydroxypropyl guar, and any combinations thereof. A viscosifier may be present in the treatment fluid in an amount from about 0 wt. % to about 1 wt. %, or any ranges therebetween, for example, from about 0.13 wt. % to about 0.16 wt. %.

The treatment fluid may include a dispersant. A dispersant may include, for example, a sulfonated-formaldehyde-based dispersant (e.g., sulfonated acetone formaldehyde condensate), polycarboxylated ether dispersants, polyoxyethylene phosphates, polyox polycarboxylates, or the like. Where used, a dispersant may reduce droplet size and improve separation of particles to reduce clumping or settling. Additionally, the treatment fluid may include an anti-sludging agent to prevent agglomeration of charged components in a crude, such as naphthenic acids, asphaltenes, and the like.

The treatment fluid may include a wetting agent. A wetting agent may alter wettability of a subterranean formation, making it either more water-wet or more oil-wet. A wetting agent may include, for example: sulfosuccinates; alkylphenol ethoxylates; and gemini-surfactants previously listed. Adsorption of a wetting agent to a surface of the subterranean formation may alter the hydrophobicity or the oleophobicity of the surface, thereby altering the wettability and changing the contact angle of an aqueous or oleaginous fluid with the surface.

The treatment fluid may include a lightweight additive. A lightweight additive may include, for example, bentonite, coal, diatomaceous earth, expanded perlite, fly ash, gilsonite, hollow microspheres, low-density elastic beads, nitrogen, pozzolan-bentonite, sodium silicate, or combinations thereof. In some examples, it may be desirable to include a lightweight additive to reduce an overall specific gravity or a density of the treatment fluid.

The treatment fluid may include weighting agents. Weighting agents are typically materials that weigh more than water and may be used to increase an overall specific gravity of a treatment fluid. By way of example, weighting agents may have a specific gravity of about 2 or higher (e.g., about 2, about 4, etc.). A weighting agent may include, for example: calcium chloride; calcium bromide; cesium salts such as bromide, iodide, or formate; zinc bromide; zinc iodide, zinc formate; hematite; hausmannite; barite; and any combinations thereof.

The treatment fluid may include an acid precursor or a delayed acid precursor. An acid precursor or delayed acid precursor may include compounds which, while not initially acidic, may degrade or react to release or generate acid. Acid precursors may include, for example, esters, orthoesters, poly(ortho ester), lactic acid derivatives, methyl lactate, ethyl lactate, propyl lactate, butyl lactate, formate esters, ethylene glycol, monoformate, ethylene glycol diformate, diethylene glycol diformate, glyceryl monoformate, glyceryl diformate, glyceryl triformate, triethylene glycol diformate, formate esters of pentaerythritol, esters of propionic acid, esters of butyric acid, esters of monochloroacetic acid, esters of glycolic acid, polyols such as glycerol and glycols, water-soluble formates, ethylene glycol monoformate, diethylene glycol diformate, esters of glycerol, polyesters of glycerol, tripropionin trilactin, esters of acetic acid, esters of glycerol, monoacetin, diacetin, triacetin, aliphatic polyesters, poly(lactides), poly(glycolides), poly($\varepsilon$-caprolactones, poly(hydroxybutyrates), poly(anhydrides), aliphatic polycarbonates, poly(amino acids), polyphosphazenes, copolymers thereof, and derivatives and combinations thereof. In one or more examples, ester linkage of a reactive ester (e.g., acid precursor) may be hydrolyzed by water to release an acidic species. Other examples include, for example: urea or aminoacid complex of hydrochloric acid, whereby the complex is further stabilized against thermodynamic aqueous dissociation by means of select surfactants.

The treatment fluid may include a filter cake removal agent. A filter cake removal agent may include, for example, an acid precursor or delayed acid precursor and optionally, an initiator component (e.g., lactate oxidase). In other examples, a filter cake removal agent may include a mutual solvent precursor (e.g., glycol ethers, ethylene glycol monobutylether, propylene glycol monobutylether, diethyl glycol monobutylether, triethylene glycol monobutylether, mineral oils, paraffins, methanol, isopropyl alcohol, alcohol ethers, aldehydes, ketones, aromatics solvents), such as an esterified mutual solvent precursor. Where used, a filter cake removal agent may assist with removing oil-based filter cake or water-based filter cake from the subterranean formation.

The treatment fluid may comprise ammonium salt of the halide, or oxyanion, or hydroxide, or chalcogen (Group 16), or quaternary alkyl (or aryl) ammonium salt, where halide is one of chloride or any Group 17 element, where the oxyanion is one of the type oxoacids and oxyhalides such as $H_iXO_n$ where n=1, 2, 3, 4 and X=F, Cl, Br, I, or i=1, 2, 3 and X=B, C, Si, N, P, S, Se, Sb and n=3, 4 or 5 and any chemically allowable combinations thereof, such as sodium nitrite or sodium hypochlorite.

The treatment fluid may comprise a thermos-chemical agent. Suitable thermos-chemical agents may include, for example, ammonium chloride and sodium nitrite. A thermos-chemical agent(s) may be individually or collectively present in the treatment fluid in a concentration of about 0.5 wt. % to about 15 wt. %. Alternatively, from about 0.5 wt. % to about 1 wt. %, about 1 wt. % to about 5 wt. %, about 5 wt. % to about 10 wt. %, about 10 wt. % to about 25 wt. %, or any ranges therebetween.

The treatment fluid may optionally include additional additives to suit a particular application. These additional additives may include, for example, fluid loss control additives, foaming agents, antifoaming agents, lubricants, breakers, relative permeability modifiers, resins, coating enhancement agents, carbon dioxide, nitrogen, natural gas, antifreeze agents (e.g., ethylene glycol), pumping agents, producing agents, flocculants, a pH-adjusting agent (e.g., buffer), a biocide, and any combinations thereof. Other additional additives may include, for example, salts, solvents, organic corrosion inhibitors and intensifiers, catalysts, clay stabilizers, bactericides, gases, iron control agents, solubilizers, and the like.

Any of the components of the treatment fluid may, whether individually or in combination, have a mean particle size in a from, for example, about 5 microns to about 7,000 microns. Alternatively, from about 5 microns to about 10 microns, about 10 microns to about 20 microns, about 20 microns to about 50 microns, about 50 microns to about 70 microns, about 70 microns to about 100 microns, about 100 microns to about 200 microns, about 200 microns to about 500 microns, about 500 microns to about 1000 microns, about 1000 microns to about 3000 microns, about 3000 microns to about 7000 microns, or any ranges therebetween. In some examples, a treatment fluid may have a multi-modal particle size distribution. By way of example, the treatment fluid may have 2, 3, 4, 5, 6, or more modal peaks. Modal peaks occur on a particle size distribution curve when there are increased particle concentrations relative to particle sizes on either side of the curve.

The treatment fluid generally should have a density suitable for a particular application. For example, the treatment fluid may have a density from about 600 kilograms per cubic meter to about 3000 kilograms per cubic meter. Alternatively, from about 600 kilograms per cubic meter to about 900 kilograms per cubic meter, about 900 kilograms per cubic meter to about 1100 kilograms per cubic meter, about 1100 kilograms per cubic meter to about 1300 kilograms per cubic meter, about 1300 kilograms per cubic meter to about 1500 kilograms per cubic meter, about 1500 kilograms per cubic meter to about 1700 kilograms per cubic meter, about 1700 kilograms per cubic meter to about 1900 kilograms per cubic meter, about 1900 kilograms per cubic meter to about 2100 kilograms per cubic meter, about 2100 kilograms per cubic meter to about 2300 kilograms per cubic meter, about 2300 kilograms per cubic meter to about 2500 kilograms per cubic meter, about 2500 kilograms per cubic meter to about 2700 kilograms per cubic meter, about 2700 kilograms per cubic meter to about 3000 kilograms per cubic meter, and any ranges therebetween.

The treatment fluid may have a viscosity from about 0.8 centipoise to about 10 centipoise. Alternatively, from about 0.8 centipoise to about 1 centipoise, about 1 centipoise to about 2 centipoise, about 2 centipoise to about 4 centipoise, about 4 centipoise to about 8 centipoise, about 8 centipoise to about 12 centipoise, or any ranges therebetween.

In some examples, the treatment fluid may have a specific gravity of about 0.5 to about 3. Alternatively, from about 0.1 to about 0.8, about 0.8 to about 1, about 1 to about 1.2, about 1.2 to about 1.5, about 1.5 to about 1.7, about 1.7 to about 2, about 2 to about 2.2, about 2.2 to about 2.5, about 2.5 to about 3, or any ranges therebetween.

Figure 1:
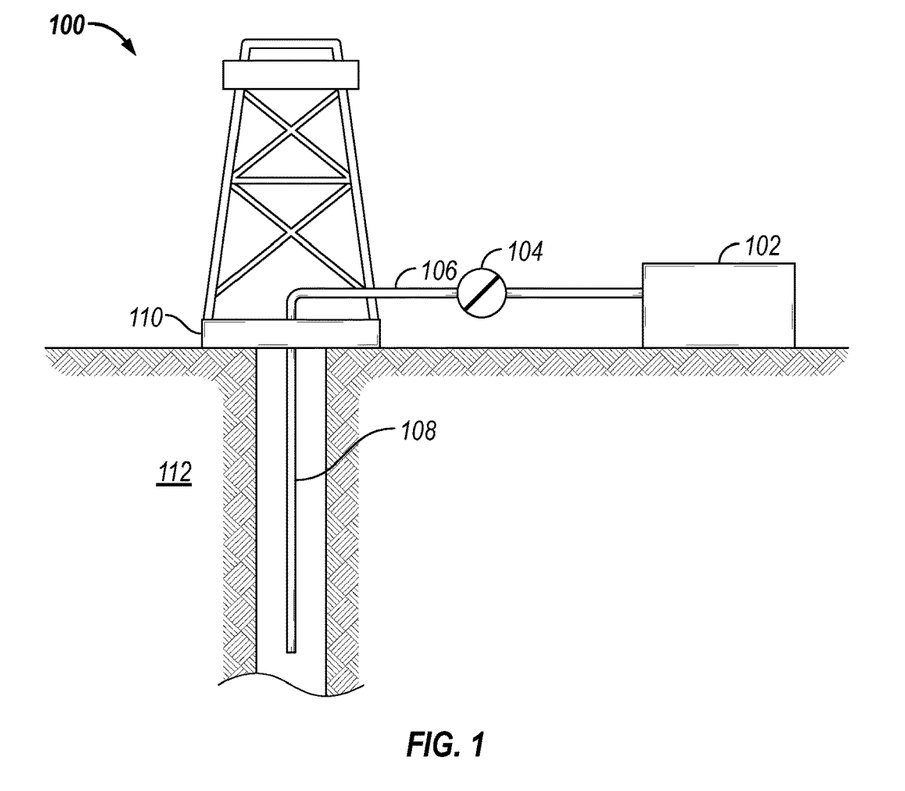
FIG. 1 illustrates surface equipment for delivering a treatment fluid to a wellbore, in accordance with certain examples.

FIG. 1 illustrates wellbore configuration for delivering a treatment fluid to a wellbore, in accordance with certain examples of the present disclosure. As illustrated, surface equipment 100 may include a mixing tank 102, a pump 104, and a wellhead 110. It should be understood that while the figures depict land-based operations, the teachings herein disclosed may be equally applied to subsea environments.

Treatment fluid may be prepared in mixing tank 102. Alternatively, preparation of the treatment fluid may be performed at an off-site location and transported to a job site using, for example, a vehicle. Shear may be applied to the treatment fluid, or to one or more components of the treatment fluid prior to introduction to subterranean formation 112. The treatment fluid may be conveyed via line 106 to wellhead 110, where the treatment fluid enters tubular 108. Tubular 108 may extend from wellhead 110 into subterranean formation 112. Tubular 108 may comprise one or more layers of metal casing. Upon entering subterranean formation 112 via tubular 108, the treatment fluid may contact subterranean formation 112. Pump 104 may pressurize treatment fluid to a predetermined pressure prior to and/or during pumping of treatment fluid into a wellbore. It is to be recognized that FIG. 1 is merely exemplary in nature and various additional components may be present which are not necessarily depicted for the sake of brevity. Non-limiting additional components which may be present may include supply hoppers, valves, condensers, adapters, joints, gauges, sensors, compressors, pressure controllers, pressure sensors, flow rate controllers, flow rate sensors, temperature sensors, and the like.

As will be discussed later in detail, the present disclosure may provide treatment fluids which may be pumped at high rates. These high rates may, in some examples, be accompanied by lower pumping pressures than would be conventionally feasible. For example, the disclosed treatment fluids may be pumped into one or more wellbores at a rate of about 2 barrels per minute to about 120 barrels per minute. Alternatively, from about 2 barrels per minute to about 20 barrels per minute, about 20 barrels per minute to about 40 barrels per minute, about 40 barrels per minute to about 60 barrels per minute, about 60 barrels per minute to about 100 barrels per minute, about 100 barrels per minute to about 120 barrels per minute, or any ranges therebetween. Pumping pressure to carry out a pumping rate of at least 20 barrels per minute may be, for example, less than 40 MPa. Pumping pressure to carry out a pumping rate of at least 40 barrels per minute may be, for example, less than 80 MPa. Pumping pressure to carry out a pumping rate of at least 100 barrels per minute may be, for example, less than 140 MPa.

Figure 2:
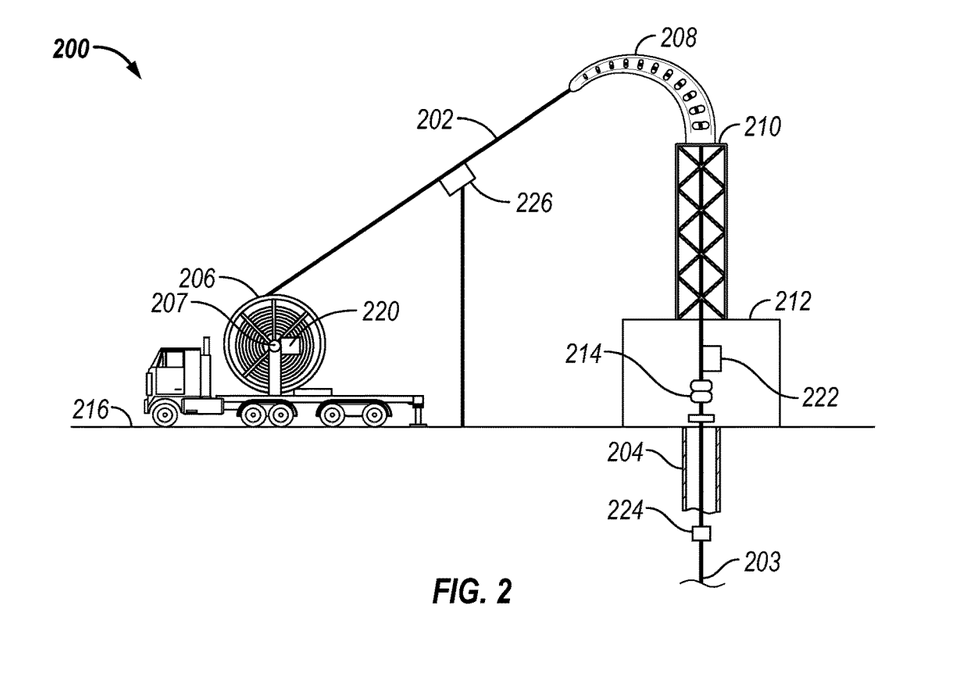
FIG. 2 illustrates a wellbore treatment configuration for performing a coiled tubing operation.

FIG. 2 is a wellbore servicing system 200. In an example, surface equipment 100 (e.g., referring to FIG. 1) may comprise coiled tubing 202 having an end 203 deployed into a wellbore 204 at surface 216. The coiled tubing 202 may be provided from a coiled tubing spool 206 having an axle 207, where the coiled tubing spool 220 plays out the coiled tubing 202 when the end 203 is driven into the wellbore 204 and that takes up the coiled tubing 202 when the end 203 is pulled out from the wellbore 204. Coiled tubing 202 may be moved into and out of wellbore 204 with an injector. Coiled tubing 202 may be supported by a gooseneck 208 coupled to a mast 210 or other supporting structure. The mast 210 or other support structure may be supported by a substructure 212. Coiled tubing 202 may be stabbed into and fed through a blowout preventer (BOP) stack 214 or a completion Christmas tree. The coiled tubing spool 206 may be referred to as the spool 206. In addition, wellbore servicing system 200 may comprise one or more sensors 224, and 226 for measuring an orientation (e.g., angle) and/or location of coiled tubing 202 and/or collars disposed in wellbore 204. End 203 may be disposed at various depths or locations within wellbore 204 and the treatment fluid may be introduced into wellbore 204 via coiled tubing 202 at the various depths or locations. As previously mentioned, pumping pressure required to pump the treatment fluid through coiled tubing 202 and/or into the subterranean formation may be reduced by the inclusion of one or more friction reducers in the treatment fluid.

As illustrated, coiled tubing 202 may comprise a long continuous flexible conduit which may be wound or unwound on a coiled tubing spool 220. Alternatively, the treatment fluid may be pumped into the subterranean formation 112 via a rigid conduit (e.g., stick pipe). In either coiled tubing or rigid conduit examples, conduit may be lowered to a desired depth in the wellbore and the treatment fluid may be pumped through the conduit and introduced into the wellbore or the subterranean formation 112. The treatment fluid may be pumped through coiled tubing or a rigid conduit using less time and energy than what would be otherwise possible due to the effects of the friction reducer on pumping rates and pressure head requirements for pumping through a coiled tube or rigid conduit. The friction reducer, in addition to reducing turbulence within fluid flow through the coiled tubing or rigid conduit, may also decrease the amount of friction experienced by the treatment fluid as a result of any surface roughness of the inner surface of the conduits.

Figure 3:
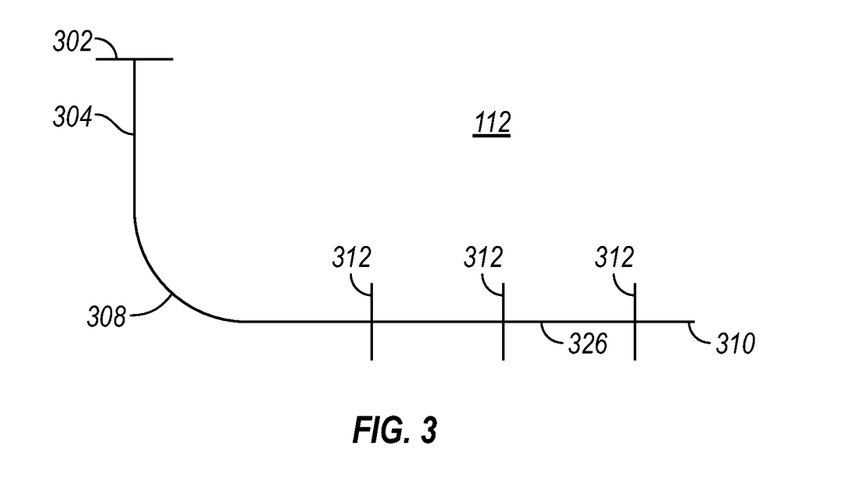
FIG. 3 illustrates a wellbore treatment configuration for acid fracturing a subterranean formation.

FIG. 3 is a wellbore servicing system 300. In an example, surface equipment 100 (e.g., referring to FIG. 1) may comprise acidizing equipment for performing matrix acidizing or acid fracturing of wellbore 304 disposed in subterranean formation 112.

Acidizing is a stimulation technique where a treatment fluid including an aqueous acid solution is introduced into the formation to dissolve acid-soluble materials that clog or constrict formation channels. As a result, hydrocarbon fluids may flow more easily out from the formation and into a well. In addition, acidizing may facilitate flow of an injected treatment fluid from a well into a formation. In acid fracturing, an increase in permeability of subterranean formation 112 is attributable to both induced fractures as well as acid etching of channels within the formation. The treatment fluid is injected into the well at sufficient pressure to induce fractures or else enlarge pre-existing fractures within the formation. The treatment fluid may include proppant, which props open the induced fractures to further enhance production. Proppant may include, for example, sand, sintered bauxite, glass balls, polystyrene beads, microproppant, and the like.

As illustrated, at least a portion 306 of wellbore 304 may be disposed horizontally in the subterranean formation 112, with a heel section 308 and a toe section 310. The treatment fluid may be delivered to subterranean formation 112 at high or low pressures through a plurality of openings in a wellbore casing. Delivery of a treatment fluid may be performed by isolating stages using one or more bridge plugs. Delivery of the treatment fluid may or may not result in various fractures 312, including transverse and/or longitudinal fractures.

As illustrated, wellbore 304 may comprise toe section 310 and heel section 308, with the toe section 310 positioned further away from surface 302 than heel section 308. As mentioned, horizontal or vertical stages may be temporarily isolated from each other using bridge plugs, and each stage acid fractured separately. A single stage may have a length of, for example, up to 3,000 meters or more. The wellbore casing at each stage may be perforated to allow the wellbore to communicate with the formation. Well stimulation occurs by pumping the treatment fluid into subterranean formation 112 and allowing the acid to contact the formation strata. As mentioned, for acid fracturing examples, pressure of the treatment fluid may exceed the reservoir pressure thus allowing one or more induced fractures 312 to form. Proppant may be used to prop open the induced fractures 312 and promote production. Proppant may be included in the treatment fluid or introduced in an additional acidic or non-acidic fracturing fluid following acid fracturing.

The treatment fluids of the present disclosure may be introduced to a subterranean formation as a single treatment fluid or in various stages. For example, a treatment fluid comprising the friction reducer and an acidizing fluid, as well as one or more corrosion inhibitors and other chemical additives may be prepared at the surface and introduced into the subterranean formation. In other examples, a treatment fluid comprising the friction reducer (with or without the acid) may be first used to prime the well before later introduction of an acidizing fluid.

In some examples, the treatment fluid may be "shut-in" a wellbore following its application, thereby giving time to allow the acid to react with the acid-soluble material. In matrix acidizing treatment operations, for example, the acid in the treatment fluid may be shut in for an amount of time from about half an hour to several hours such as 8 h and even up to 72 h. For example, from about half an hour to about 5 hours, about 5 hours to about 12 hours, about 12 hours to about 24 hours, about 24 hours to about 1 week, or any ranges therebetween. Treatment fluid in a matrix acidizing operation may be pumped at either a "low" flow rate, or a "high" flow rate, such as at a rate from about 2 barrels to about 65 barrels per minute or even 100 barrels per minute when operationally feasible. In matrix acidizing, the treatment fluid is injected from the well into the formation at a rate and pressure lower than that required to fracture the formation. The acid permeates into channels and dissolves materials that clog or constrict the channels, thereby increasing permeability of the formation. This increase in permeability is therefore majorly attributable to reaction of the acid within the formation, with little or no attribution to induced fractures.

In other examples, the treatment fluid may be pumped into the subterranean formation 112 as part of a wellbore cleanout. During drilling, construction, or production of a well, debris such as sand, scale, organic materials, and other debris may form in the wellbore. For example, some reservoirs may produce "fines" such as sand which may not be carried to the surface by the production fluid. This debris may periodically need to be removed. The treatment fluid of the present disclosure may be used to at least partially dissolve and/or remove this debris. Particularly, the friction reducers herein disclosed may allow for faster pumping of the treatment fluid and/or lower the amount of energy losses of performing wellbore cleanout. This may allow the treatment fluids to include higher concentrations of acids or else lower pHs than what would typically be allowed since the treatment fluids may be introduced faster into the formation and thus reduce the time of exposure to the tools, tubulars, and other downhole components susceptible to acid corrosion.

In other examples, the treatment fluid may be pumped into subterranean formation 112 (e.g., referring to FIG. 1) as part of a filter cake removal operation. Filter cake removal is the removal of filter cake from a borehole and may be performed prior to tubular make-up of a wellbore casing. In contrast to a scale removal operation, which is typically performed after installation of a wellbore casing, filter cake removal removes substance formed on the surface of the borehole prior to construction of the wellbore. Filter cake may comprise materials deposited from, for example, wellbore fluids such as drilling and drill-in fluids, which forms a semi-permeable medium through which, if not removed, may interfere with production by requiring production fluid to migrate through. Among other things, filter cake may cause stuck pipes, drilling problems, reduced production rates, and in some scenarios, reservoir damage. To mitigate these effects, the filter cake may be removed by pumping the treatment fluid into the borehole and allowing the treatment fluid to contact the filter cake for a sufficient amount of time to at least partially dissolve or otherwise free the filter cake from the borehole surface. After the filter cake is partially dissolved or dislodged from the borehole, it may be flushed out with flush fluid. The treatment fluid of the present disclosure may allow for filter cake removal operations to be performed using less time and energy, since the friction reducers may enable the treatment fluids to be introduced at higher flow rates, result in reduced friction losses, a lower the surface pressure requirement, etc.

In other examples, the treatment fluid may be pumped into subterranean formation 112 (e.g., referring to FIG. 1) as part of a scale removal operation. Scale removal is the removal of scale from the part of the subterranean formation in communication with the wellbore, as well as from any internal regions of a wellbore or wellbore casing where buildup of scale has occurred. Scale is a deposit formed on the surface of a metal, rock, or material, and may be caused by precipitation of one or more components of a reservoir or wellbore fluid. Precipitation of scale may be caused by chemical reactions, a change in pressure or temperature, or a change in the concentration of a chemical species in the fluid. Metal corroded by acid may also take part in the scale deposition process. Scale may comprise calcium carbonate, gypsum, anhydrite, barite (e.g., barium sulfate), celestite (e.g., strontium sulfate), calcium sulfate, iron sulfide, iron oxide, iron carbonate, various silicates, phosphates, oxides, mineral salt, and other compounds having low water-solubility. In some cases, scale build-up may seriously restrict flow or even plug tubulars or wellbore casing. Removal of scale may be performed using the treatment fluid of the present disclosure and optionally, mechanical tools (e.g., wellbore intervention tools). Mechanical tools may include, for example, scrapers, pigs, and other intervention tools. The treatment fluid of the present disclosure may allow for scale removal operations to be performed using less time and energy, since the friction reducers may allow for higher pumping/flow rates, reduced energy losses, reduced surface pressure requirement, etc.

In other examples, the treatment fluid may be pumped into subterranean formation 112 (e.g., referring to FIG. 1) as part of a gravel pack clean out operation. Gravel packing is a sand-control method sometimes performed during wellbore completion for preventing production of formation sand and may involve placement of a steel screen in the wellbore and specifically-sized gravel in the wellbore annulus. The gravel introduced during gravel packing stabilizes the formation without inhibiting production. During production, interstitial spaces within the gravel may accumulate debris or other fouling materials that block or interfere with production. The treatment fluid may be introduced into a gravel pack to remove or dissolve the interfering material. The reduced friction of the treatment fluids of the present disclosure may allow for quicker flow and therefore faster permeation of the treatment fluid into the gravel pack.

In other examples, the treatment fluid may be pumped into subterranean formation 112 (e.g., referring to FIG. 1) as part of a frac-pac clean-out operation. Frac packing is a wellbore completion technique that serves to perform both gravel packing and hydraulic fracturing. In frac packing, proppant may serve both to prop open the formation and, like a gravel pack, fill spaces and voids (e.g., annulus) around the wellbore and stabilize the wellbore. The "frac-pac" left behind by a frac packing operation is analogous to a gravel pack and serves a similar purpose. The treatment fluid of the present disclosure is equally applicable for cleaning out a frac-pac as for cleaning out a gravel pack and may exhibit similar advantages of quicker flow and reduced energy loss.

In other examples, the treatment fluid may be pumped into subterranean formation 112 (e.g., referring to FIG. 1) as part of a re-fracturing or re-stimulation treatment of a previously hydraulically fractured well. As previously discussed, a wellbore may be hydraulically fractured or acidized with the treatment fluid. In some scenarios, it may be desirable to re-fracture or re-acidize the wellbore. The advantages of using the treatment fluids of the present disclosure in fracturing and acidizing equally apply to re-fracturing and re-acidizing.

Figure 4:
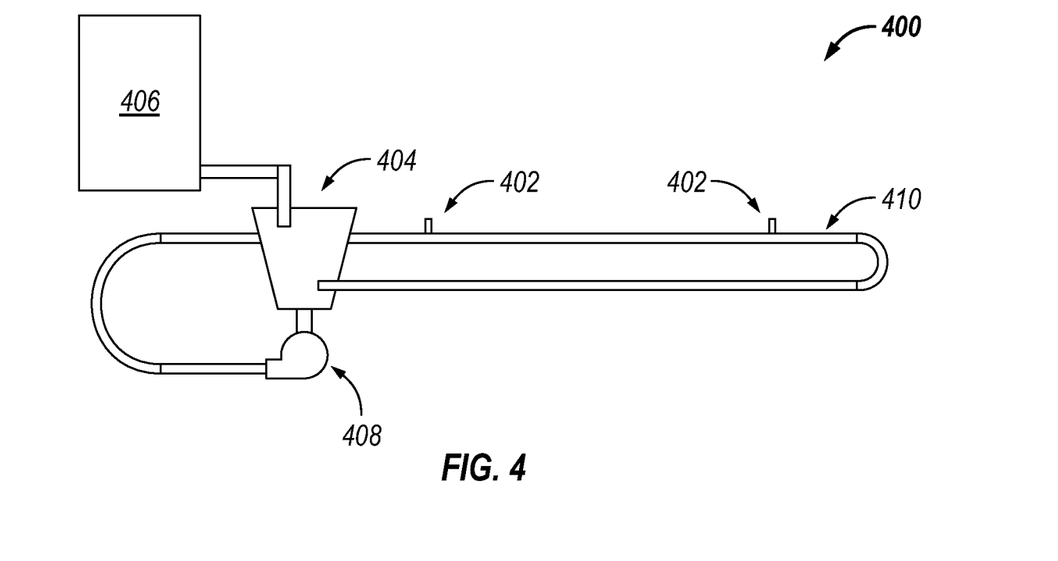
FIG. 4 illustrates a friction flow loop system.

FIG. 4 illustrates a friction flow loop system 400. As illustrated, friction flow loop system 400 comprises a pump 408, a tank 404, a temperature control unit 406, and a test pipe 410. Test pipe 410 has a ½-inch inner diameter. As illustrated, pressure drop across two measurement points 402 of a straight section of test pipe 410 is measured using, for example, a pair of pressure transducers. During testing, test fluid is pumped using pump 408 through test pipe 410 at 10 gallons per minute. Temperature of test fluid disposed in tank 404 may be monitored and controlled with temperature control unit 406. Control unit 406 maintains temperature of test fluid at standard conditions (e.g., 25° C.) or at conditions simulating wellbore conditions (e.g., between 25° C. and 180° C.). Test fluid is pumped at a constant rate of 10 gallons per minute through friction flow loop system 400 for at least 5 minutes and up to 20 minutes, during which pressure at the two measurement points are recorded. Pressure drop is the difference in pressure between the two measurement points 402 at a given point in time while pumping. As illustrated, the two measurement points 402 are disposed on two sides of a straight length section of ½ inch-diameter pipe at a pumping rate of 10 gallons per minute. The ½ inch-diameter pipe has an absolute roughness coefficient less than 0.02, and the two measurement points 402 are spaced between 8 to 12 feet apart. The pressure measurements used to calculate friction reduction are taken between 5 and 20 minutes after pumping begins. Pumping is performed continuously and at a constant (or essentially constant) rate of 10 gallons per minute during the entirety of the test.

Percent friction reduction is the percent change in pressure drop of a first test fluid to a second test fluid across two measurement points 402 in friction flow loop system 400. Percent friction reduction of a second test sample with respect to a first test sample may be estimated using an equation having the form:

$$\%\Delta FR \approx \frac{|\Delta P_a - \Delta P_b|}{\Delta P_a} * 100 \qquad (eq.\ 1)$$

where $\Delta P_a$ is the pressure drop between measurement points 402 during pumping of the first test sample between 5 minutes and 20 minutes after pumping the first test sample through friction flow loop system 400 begins, and where $\Delta P_b$ is the pressure drop between measurement points 402 during pumping of the second test sample between 5 minutes and 20 minutes after pumping the second test sample through friction flow loop system 400 begins. To measure the effect of one or more friction reducers on the performance of a treatment fluid, the first test fluid consists of the treatment fluid which comprises the one or more friction reducers, and the second test fluid consists of the treatment fluid without the one or more friction reducers.

Alternatively, rather than testing the percent change in pressure drop of the two test samples, friction flow loop system 400 may be used to test a percent change in flow rate between two test samples. This may be achieved by testing the two samples at a fixed pumping power and variable flow rate rather than at a fixed flow rate. Measured percent reduction in pressure drop and percent increase in flow rate both correlate positively with percent reduction in friction of a treatment fluid or test sample. The amount of surface/pumping pressure and pumping power required to achieve a given flow rate correlates negatively with percent friction reduction. These specific effects may be attributed at least in part to the inclusion of one or more friction reducing moieties (e.g., a vinyl phosphonic acid moiety, an acrylic acid moiety, a vinyl sulfonate moiety, a diallyl moiety, or an acrylamide moiety) in the molecular structure of the friction reducers.

Corrosion inhibitors and other chemical additives (e.g., surfactants or other species described herein) may also be present in the test samples being measured in friction flow loop system 400. Inclusion of the corrosion inhibitors or other additives during testing of friction reducers helps determine compatibility between the corrosion inhibitors (or additives) and a particular treatment fluid. By testing both friction reducers and corrosion inhibitors (or additives) together, corrosion inhibitors may be specifically formulated into an acid blend containing a friction reducer to determine suitability of a treatment fluid for a wellbore operation. This procedure helps to identify friction reducers that do not allow the coalescence of the different chemical additives into a single homogenous phase. For example, selection of a friction reducer and/or corrosion inhibitor may be based upon whether or not a test sample forms of a single homogenous phase.

In addition, elongation and/or elongation preservation of a treatment fluid being tested (e.g., acid blend) may be measured to determine compatibility between the corrosion inhibitor and the friction reducer. Elongation preservation refers to the ability of a treatment fluid modified with a friction reducer to maintain elongation (e.g., polymer or elastomeric length) as it is agitated, such as when being carried along by pipe flow. Elongation and elongation preservation are primarily functions of the choice of friction reducer for a given acid blend. However, as with the properties mentioned above, these and other properties may also be affected by the choice of corrosion inhibitor used in a treatment fluid. As such, selection of a friction reducer and/or corrosion inhibitor may be based upon whether or not a test sample maintains good elongation. In one or more examples, the treatment fluids of the present disclosure may have elongation preservation such that after 1 hour, 2 hours, or 6 hours, the treatment fluid preserves at least 75%, at least 80%, and in some examples, at least 90% of its elongation.

Accordingly, the present disclosure may provide treatment fluids and methods of selecting friction reducers for treatment fluids, the treatment fluids having enhanced friction reduction and acid-compatibility. The methods and compositions may include any of the various features disclosed herein, including one or more of the following statements.

Statement 1: A method comprising: introducing a treatment fluid into a wellbore extending into a subterranean formation, wherein the treatment fluid comprises: water; an acid; a corrosion inhibitor; and a friction reducer having a vinyl phosphonic acid moiety, an acrylic acid moiety, a vinyl sulfonate moiety, a diallyl moiety, or an acrylamide moiety; and flowing at least a portion of the treatment fluid into the subterranean formation, wherein the pressure required to achieve a given flow rate of the treatment fluid into the subterranean formation is reduced by at least 1% as compared to the pressure required to achieve the given flow rate of the treatment fluid in the subterranean formation without the friction reducer.

Statement 2: The method of statement 1, wherein the friction reducer is polymeric and has a molecular weight from about 5,000 kilodaltons to about 25,000 kilodaltons.

Statement 3: The method of statement 1 or 2, wherein the friction reducer is amphoteric or cationic.

Statement 4: The method of statement 1 or 2, wherein the friction reducer is anionic.

Statement 5: The method of statement 1 or 2, wherein the friction reducer is a quaternized pendant polyacrylate polymer.

Statement 6: The method of any of the preceding statements, wherein the treatment fluid is pumped into the wellbore at a rate from about 2 barrels per minute to about 120 barrels per minute.

Statement 7: The method of statement 6, wherein the treatment fluid achieves a pumping rate exceeding 20 barrels per minute while being pumped at a pressure less than 140 MPa.

Statement 8: The method of any of the preceding statements, further comprising matrix acidizing the subterranean formation with the treatment fluid.

Statement 9: The method of statement 8, wherein the wellbore is a previously acidized wellbore.

Statement 10: The method of any of statement 1-7, further comprising acid fracturing the subterranean formation with the treatment fluid by pumping the treatment fluid at or above a fracture gradient of the subterranean formation.

Statement 11: The method of any of statements 1-7 or 9-10, wherein the treatment fluid further comprises proppant.

Statement 12: The method of any of the preceding statements, wherein the wellbore is a previously fractured wellbore.

Statement 13: The method of any of statements 1-7, wherein the flowing at least a portion of the treatment fluid is performed as part of a coiled tubing operation, a filter cake removal operation, a gravel pack cleanout, or a frac pac cleanout.

Statement 14: The method of any of the preceding statements, wherein pressure drop of the treatment fluid between two measurement points in a friction flow loop system is reduced by at least 5% compared to a pressure drop of the treatment fluid without the friction reducer, or wherein a flow rate of the treatment fluid in the friction flow loop system is increased by at least 5% compared to the treatment fluid without the friction reducer.

Statement 15: The method of any of the preceding statements, wherein the treatment fluid further comprises at least one additive selected from the group consisting of: a surfactant; a diverter; an acid scavenger; a chelating agent, a scale inhibitor, an iron control agent, a viscosifying agent, a cross-linking agent, a breaker or oxidizing agent, a viscosifier, a dispersant, a wetting agent, a non-emulsifying agent; a thermo-chemical agent; a corrosion inhibitor intensifier agent, a foaming agent; carbon dioxide; nitrogen; natural gas; a filter cake removal agent; and any combination thereof.

Statement 16: A treatment fluid comprising: water; an acid; a corrosion inhibitor; and a friction reducer having a vinyl phosphonic acid moiety, an acrylic acid moiety, a vinyl sulfonate moiety, a diallyl moiety, or an acrylamide moiety, wherein pressure drop of the treatment fluid across two measurement points in a ½ inch diameter friction flow loop system at 10 gallons per minute is reduced by at least 0.05% as compared to the treatment fluid without the friction reducer.

Statement 17: The treatment fluid of statement 16, further comprising at least one additive selected from the group consisting of: a surfactant; a diverter; an acid scavenger; a chelating agent, a scale inhibitor, an iron control agent, a viscosifying agent, a cross-linking agent, a breaker or oxidizing agent, a viscosifier, a dispersant, a wetting agent, a non-emulsifying agent; a thermo-chemical agent; a corrosion inhibitor intensifier agent, a foaming agent; carbon dioxide; nitrogen; natural gas; a filter cake removal agent; and any combination thereof.

Statement 18: The treatment fluid of statement 17, wherein the at least one additive comprises a thermos-chemical agent comprising ammonium chloride and sodium nitrite.

Statement 19: The treatment fluid of statement 16, 17, or 18, wherein the friction reducer is a quaternized pendant polyacrylate polymer.

Statement 20: The treatment fluid of any of statements 16-19, wherein the friction reducer is polymeric and has a molecular weight from about 5,000 kilodaltons to about 25,000 kilodaltons, wherein the friction reducer is amphoteric, cationic, or anionic, and wherein the friction reducer is present in the treatment fluid in an amount between 100 ppm and 1,000 ppm, and wherein the percent reduction in pressure drop is at least 5%.

To facilitate a better understanding of the present invention, the following examples of certain aspects of some embodiments are given. In no way should the following examples be read to limit, or define, the entire scope of the disclosure.

EXAMPLES

The following examples were performed to measure the effects of including various friction reducers in various acid blends.

Figure 5:
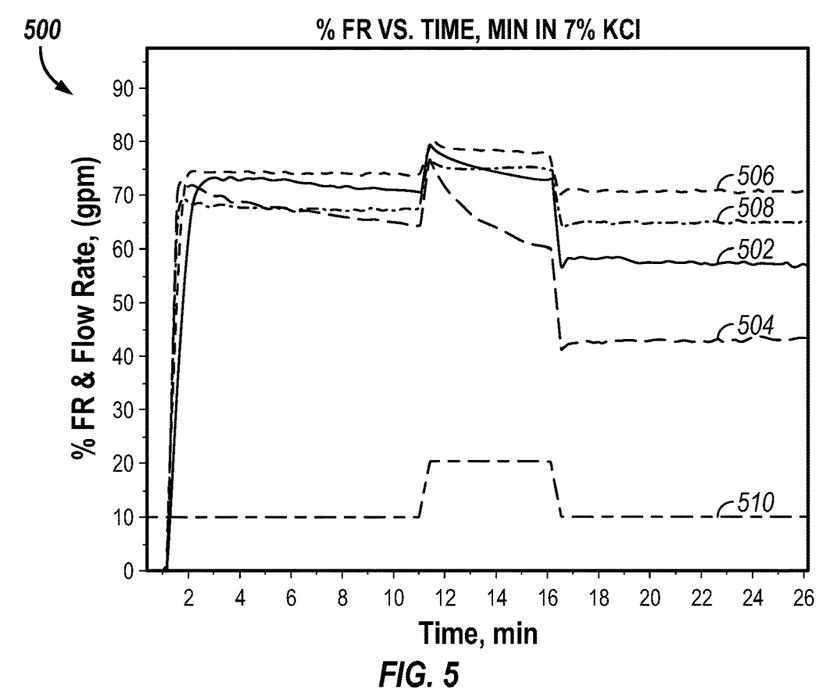
FIG. 5 is a plot showing results of a friction loop test for a group of polymers using a friction flow loop system.

FIG. 5 is a plot 500 illustrating data for a friction loop test for a first set of test samples 502, 504, 506, 508 compared to a control sample 510 using friction flow loop system 400 (e.g., referring to FIG. 4). Test samples 502, 504, 506, and 508 each included a friction reducer at a concentration (measured in gallons of the friction reducer per thousand gallons of fluid) in 7 wt. % KCl brine and were measured against a control sample comprising 7 wt. % KCl brine without the friction reducers at ambient temperature and pressure. The samples also included a solvent, a corrosion inhibitor, acid, and surfactant. Percent friction reduction was determined for each sample tested. The first set of samples, shown in FIG. 5, includes test sample 506 (Excelerate™ LX-1M (hydrotreated petroleum distillate) at 1 GPT), test sample 504 (SGA-HT™ (polyacrylate copolymer) at 1 GPT), test sample 502 (Excelerate™ LX-1M (hydrotreated petroleum distillate) at 5 GPT), and test sample 508 (SGA-HT™ (polyacrylate copolymer) at 5 GPT). As illustrated, each of samples 502, 504, 506, and 508 exhibit reduced friction as compared to a control sample 510 as evidenced by their increase in flow rate. Other friction reducers herein disclosed may exhibit similar reductions in friction and increased flow rates in a friction loop test as observed in the test data shown in FIGS. 5 and 6. GPT denotes the number of gallons of an additive per 1000 gallons of a treatment fluid that includes the additive.

Figure 6:
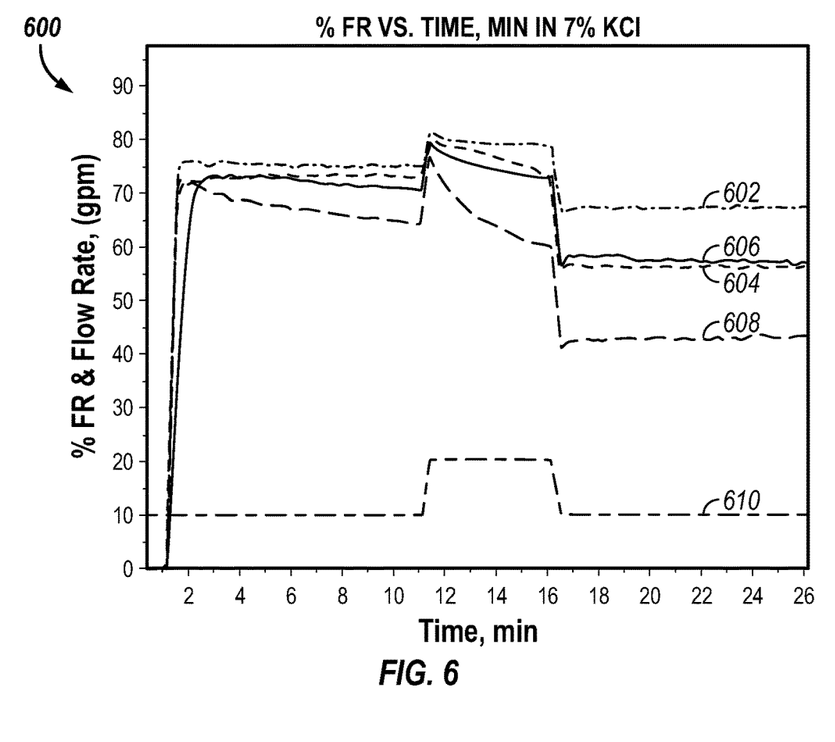
FIG. 6 is another plot showing results of a friction loop test for a group of polymers using a friction flow loop system.

FIG. 6 is a plot 600 illustrating data for a friction loop test using friction flow loop system 400 for a second set of test samples 602, 604, 606, and 608. The second set of samples, shown in FIG. 6, includes test sample 602 (FDP-S1435-21 (polyacrylate copolymer) at 3 GPT), test sample 606 (Excelerate LX-1M (hydrotreated petroleum distillate) at 1 GPT), test sample 604 (FDP-S1432-21 (polyacrylate copolymer) at 1 GPT), and test sample 608 (SGA-HT™ (polyacrylate copolymer) at 1 GPT). Samples in the second set also each comprised a friction reducer in a 7 wt. % KCL brine and were measured against control sample 610. As illustrated, samples 602, 604, 606, and 608 each exhibit reduced friction as evidenced by their increased flow rates as compared to control sample 610 comprising the samples without the friction reducer.

In one or more examples, friction reducers of the present disclosure may result in a friction reduction from about 0.05% to about 5% v/v when included in the treatment fluid as compared to a control sample 510 or 610. Alternatively, from about 0.05% to 0.1%, from 0.1% to about 0.5%, about 0.5% to about 1.0%, about 1.0% to about 5%, or any ranges therebetween. Alternatively, the treatment fluids of the present disclosure may experience friction reduction by at least 0.05% v/v with the inclusion of one or more friction reducers, and in some examples, at least 1% or at least 5% v/v as compared to the treatment fluid without the one or more friction reducer. In other examples, by at least 10% v/v, and in some examples, by at least 15%. The amount of power (i.e., horsepower), pressure (e.g., surface pressure), and/or size (or number) of pump(s) required to pump a treatment fluid into one (or more) wellbores or into the subterranean formation during any of the disclosed operations may, for a given flow rate, be decreased by at least 0.5%, at least 1%, at least 5%, and in some examples, by at least 10% as compared to the treatment fluid without the one or more friction reducers. The flow rate of a treatment fluid into a wellbore or subterranean formation during any of the disclosed operations may, for a given wellbore pressure (e.g., surface pressure or bottomhole pressure), be increased by at least 0.5%, at least 1%, at least 5%, and in some examples, by at least 10% as compared to the treatment fluid without the one or more friction reducers.

The disclosed treatment fluids may also directly or indirectly affect the various downhole equipment and tools that can come into contact with the treatment fluids during operations. Such equipment and tools may include, without limitation, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), coupling (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described in the foregoing.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

What is claimed is:

1. A method comprising:
   introducing a treatment fluid into a wellbore extending into a subterranean formation, wherein the treatment fluid comprises:
   water;
   an acid, wherein the treatment fluid comprises between 15 wt. % and 45 wt. % of the acid;
   a corrosion inhibitor; and
   a friction reducer comprising:
   an acrylic acid moiety;
   an acrylamide moiety; and
   at least one friction reducing moiety selected from the group consisting of:
   a vinyl phosphonic acid moiety, a vinyl sulfonate moiety, a diallyl moiety, and any combination thereof; and
   flowing at least a portion of the treatment fluid into the subterranean formation,
   wherein the pressure required to achieve a given flow rate of the treatment fluid into the subterranean formation is reduced by at least 1% as compared to the pressure required to achieve the given flow rate of the treatment fluid in the subterranean formation without the friction reducer, and wherein after 2 hours of exposure to the treatment fluid, the friction reducer preserves at least 80% of its elongation.

2. The method of claim 1, wherein the friction reducer is polymeric and has a molecular weight from about 5,000 kilodaltons to about 25,000 kilodaltons.

3. The method of claim 1, wherein the friction reducer is amphoteric or cationic.

4. The method of claim 1, wherein the friction reducer is anionic.

5. The method of claim 1, wherein the friction reducer is a quaternized pendant polyacrylate polymer.

6. The method of claim 1, wherein the treatment fluid is pumped into the wellbore at a rate from about 2 barrels per minute to about 120 barrels per minute.

7. The method of claim 6, wherein the treatment fluid achieves a pumping rate exceeding 20 barrels per minute while being pumped at a pressure less than 140 MPa.

8. The method of claim 1, further comprising matrix acidizing the subterranean formation with the treatment fluid.

9. The method of claim 8, wherein the wellbore is a previously acidized wellbore.

10. The method of claim 1, further comprising acid fracturing the subterranean formation with the treatment fluid by pumping the treatment fluid at or above a fracture gradient of the subterranean formation.

11. The method of claim 10, wherein the treatment fluid further comprises proppant.

12. The method of claim 11, wherein the wellbore is a previously fractured wellbore.

13. The method of claim 1, wherein the flowing at least a portion of the treatment fluid is performed as part of a coiled tubing operation, a filter cake removal operation, a gravel pack cleanout, or a frac pac cleanout.

14. The method of claim 1, wherein pressure drop of the treatment fluid between two measurement points in a friction flow loop system is reduced by at least 5% compared to a pressure drop of the treatment fluid without the friction reducer, or wherein a flow rate of the treatment fluid in the friction flow loop system is increased by at least 5% compared to the treatment fluid without the friction reducer.

15. The method of claim 1, wherein the treatment fluid further comprises at least one additive selected from the group consisting of: a surfactant; a diverter; an acid scavenger; a chelating agent, a scale inhibitor, an iron control agent, a viscosifying agent, a cross-linking agent, a breaker or oxidizing agent, a viscosifier, a dispersant, a wetting agent, a non-emulsifying agent; a thermo-chemical agent; a corrosion inhibitor intensifier agent, a foaming agent; carbon dioxide; nitrogen; natural gas; a filter cake removal agent; and any combination thereof.

16. The method of claim 1, wherein at least one friction reducing moiety comprises 5-ethenyl-1,3-benzenedisulfonic acid, 5-ethenyl-2-hydroxy-1,3-benzenedisulfonic acid, or 4-vinylbenzenesulfonic acid.

17. The method of claim 1, wherein at least one friction reducing moiety comprises 2-acrylamidoethanesulfonic acid or 2-methyacylamidoethanesulfonic acid.

18. The method of claim 1, wherein at least one friction reducing moiety comprises 2-acrylamido-2-methyl-1-propanesulfonic acid (AMPS).

19. The method of claim 1, wherein at least one friction reducing moiety comprises 3-acrylamidopropanesulfonic acid, 2-acrylamidopropanesulfonic acid, 4-acrylamidobutanesulfonic acid, or 2-acrylamidobutanesulfonic acid.

* * * * *